United States Patent [19]

Baker

[11] 4,038,686
[45] July 26, 1977

[54] DEFECT DETECTION AND COMPENSATION

[75] Inventor: Alfred Lynn Baker, Indianapolis, Ind.

[73] Assignee: RCA Corporation, New York, N.Y.

[21] Appl. No.: 664,674

[22] Filed: Mar. 8, 1976

[30] Foreign Application Priority Data

Mar. 10, 1975 United Kingdom ............... 9951/75
Feb. 26, 1976 United Kingdom ............... 9951/75

[51] Int. Cl.² .................................................. H04N 5/76
[52] U.S. Cl. ................................... 358/127; 358/8; 358/128; 360/38
[58] Field of Search ................... 358/127, 128, 8; 360/38

[56] References Cited

U.S. PATENT DOCUMENTS

| 3,912,858 | 10/1975 | Kenney | 360/38 |
| 3,925,605 | 12/1975 | Rennick | 358/127 |
| 3,925,811 | 12/1975 | Kenney | 358/8 |
| 3,947,873 | 3/1976 | Buchan | 360/38 |
| 4,000,511 | 12/1976 | Kenney | 358/8 |
| 4,001,496 | 1/1977 | Clemens | 358/127 |
| 4,006,295 | 2/1977 | Oprandi et al. | 358/127 |

Primary Examiner—Raymond F. Cardillo, Jr.
Attorney, Agent, or Firm—Eugene M. Whitacre; William H. Meagher

[57] ABSTRACT

In a video disc player, color picture information recorded in FM carrier form is recovered from the output of player's signal pickup apparatus by an FM demodulator. The FM demodulator includes zero crossing detector circuitry providing a pulse in response to each zero crossing of its signal input, a monostable multivibrator developing a pulse of a substantially fixed width when triggered by an output pulse of the zero crossing detector, and means for low pass filtering the output of the monostable multivibrator to develop signals for application to the player's video signal processing circuits. An output pulse of the zero crossing detector, and an output pulse of the monostable multivibrator subject to a selected delay comprise the inputs to a gate circuit, which develops an output pulse upon any instance of overlapping presence of the respective input pulses to indicate the presence of input signal conditions tending to produce a "white" defect during picture display. A capacitor is subject to charging toward the turn-on threshold potential of a second gate having its inputs coupled thereto. Resetting of the capacitor charging circuit is effected in response to an output of the monostable multivibrator. The capacitor charging time constant is selected so that the threshold is reached if the recurrence rate of the multivibrator output pulses falls below a reference rate less than twice the lowest intended picture carrier frequency, whereby gate switching indicates the presence of input signal conditions tending to produce a "black" defect during picture display. The respective defect indications are subject to summing and stretching, and are utilized to control substitution of stored picture information during defect occurrences.

10 Claims, 4 Drawing Figures

DEFECT DETECTION AND COMPENSATION

The present invention relates to novel defect compensation apparatus suitable for use in playback of a video record employing an FM carrier recording format, and to novel defect detection apparatus for use in effecting such defect compensation.

In U.S. Pat. No. 3,842,194, issued to Jon K. Clemens on Oct. 15, 1974 a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded information comprises a carrier frequency modulated in accordance with video signals and appears in the form of successive groove bottom depth alternations between maximum and minimum depths. In use of such a FM carrier recording format, FM detector apparatus must be employed in the player to obtain video signals from the recovered FM signal.

Illustratively, the FM detector in the player may comprise a zero-crossing detector and a monostable multivibrator responsive thereto for providing an output pulse of a standard width and amplitude in response to each zero-crossing of the input signal. The output pulses are applied to a low-pass filter having a passband substantially matching the recorded video signal bandwidth to develop the desired video signals.

In operation of a video disc player of the above-described type to recover recorded video signals for image display purposes, a problem observable in the displayed picture (in the absence of suitable compensation) is the intermittent appearance in random locations of disturbances in the form of white and/or black spots and streaks supplanting the appropriate picture information. These picture defects may vary in length, thickness and persistence of appearance. While not destructive of the picture information as a whole, the intermittent appearance of such picture defects can be a source of considerable annoyance to the viewer. The present invention is concerned with compensation apparatus for substantially eliminating or significantly reducing the annoying effects of such picture defects.

As explained in the copending application, Ser. No. 594,429 of Jon K. Chemens, et al., now U.S. Pat. No. 4,001,496, a variety of different causes may lead to the production of different ones of the annoying picture spots and streaks. Some of the causes may be associated with defects in the record itself, which may originate in various stages associated with the record production. Other causes may be associated with the condition encountered in a particular playing of a given disc: e.g., due to stylus encounters with debris of various forms in various regions of the disc groove, which may be subject to change with successive plays of a disc. Other causes may be associated with the past history of use or abuse of the disc being played, and involve mechanical alterations of the disc surface: e.g., scratches, chips or dents; or chemical alterations of the disc surface, due for example, to the effects of fingerprints on the disc coatings. Thus, there are myriad causes of differing types which result in the defect problem having a high degree of unpredictability, and varying from disc to disc, play to play, groove region to groove region etc.

In the aforementioned copending Clemens, et al. application, it is recognized that the defects are manifested as spurious alterations of the repetition rate of zero crossings (e.g., introducing extra zero crossings, or missing zero crossings) in the recovered signal. The result of extra zero crossings or missing zero crossings appear as an abrupt change in frequency toward and usually beyond one of the deviation range frequency limits associated with the recorded signal. This appears in the video output signal of the FM detector filter as a shift to an extreme white or black level. Moreover, due to the limited frequency response of the filter, the spurious shift (and subsequent return to normal) is stretched in time relative to the actual duration of the spurious condition in the input FM signal. Additionally, ringing effects associated with reactive elements of the filter are likely to persist in disturbing the output video signal for at least a short period following termination of the spurious input signal condition.

The aforesaid copending Clemens, et al. application employs an approach to defect detection which is based upon several well-grounded premises: (1) that the instantaneous carrier frequency of the FM signal input to the player's FM detector is shifted by desired signal information only within known, fixed limits (i.e., as determined by the deviation range employed in recording), wherefore shifts to frequencies beyond such limits are due not to desired signal information but to spurious, defective signal development or delivery conditions; (2) that essentially all of the noticeable, troublesome picture defects of the type here discussed stem from input signal defects that shift the apparent instantaneous carrier frequency well beyond the known deviation range limits.

In the approach of the Clemens, et al. application, a first means coupled to the player's FM demodulator develops an output impulse when the instantaneous frequency of the recovered signal exceeds a first threshold frequency beyond the upper limit of the intended deviation range; additional means coupled to the FM demodulator develops an output impulse when the instantaneous frequency of the recovered signal falls below a second threshold frequency beneath the lower limit of the intended deviation range. The respective output impulses are summed in an adder to form a defect indication signal, providing an indication of the intervals occupied by those input signal defects that engender the troublesome picture defects previously discussed. The defect indication signal is used to control switching of the player from a normal operating mode to a defect compensation mode. In the latter mode, a delayed signal constituting information from a preceding image line is used, in substitution for the current video signal output of the FM detector, to develop the player output signal. Because of the general redundancy of information in successive image lines, the preceding line information substitution serves to mask the defect occurrence, rendering it relatively unnoticeable to the image viewer. However, because of the limited bandwidth of the video signal output filter of the player's FM demodulator, the termination of the signal disturbance in the output of the latter filter may be expected to lag the termination of the associated input signal defect. In recognition of this lag effect, there is associated with the player mode switching apparatus of the aforesaid Clemens, et al. application suitable means for effectively "stretching" the effect of the defect indication pulses so as to maintain the substitution mode until the current signal output of the FM detector filter is substantially free of the disturbances that cause defective image display.

The present invention is directed to improved forms of defect compensation apparatus of the general type of the Clemens, et. al. application as described above.

A technique for identification of input signal frequency departures from the above-mentioned threshold frequency boundaries, as disclosed in the Clemens, et al. application, relies upon comparison of the instantaneous level of a video signal developed from an output of the player's FM detector with maximum and minimum levels closely related to the instantaneous video signal levels that are produced by that FM detector in response to input signal frequencies at the deviation range limits. The input to the level comparators is not the normally filtered video signal output of the FM detector used for image display purposes, but rather is an output developed by a defect detector input filter in the form of a low pass filter having a cutoff frequency well above the highest recorded video signal frequency. For accuracy of the level comparison, the input to the level comparators appropriately includes the DC component of the recovered video signal.

A rise in the voltage level at the output of the defect detector input filter to a level above a high level comparator threshold, initiates a defect indication pulse in the comparator output; in a representative FM format wherein video signal excursions in the "white" direction cause an increase in carrier frequency, this comparator output is indicative of the onset of a "white" defect in the displayed image. A similar development of a "black" defect indication pulse is provided by a low level comparator in response to a shift to the defect detector filter output level below the low level comparator threshold. The wideband response of the defect detector input filter aids in the provision of an early indication of the onset of the defect by the level comparators.

In accordance with the principles of the present invention, detection of input signal frequency shifts above an upper threshold frequency value is effected by a timing-responsive technique that possesses advantages in practical implementation over the above-described voltage level comparison techniques. By judicious use of a pair of signals already available in the circuitry of a suitable form of FM detector, a timing comparison of such signals may be effected in a manner permitting white defect detection with relatively simple and reliable apparatus.

In accordance with an illustrative embodiment of the present invention, for use with an FM detector of the previously described type employing a monostable multivibrator triggered by the output pulses of a zero crossing detector, an output of the multivibrator is subjected to a short delay of a magnitude selected to ensure that the leading edge of the delayed pulse trails the trailing edge of the crossing detector pulse which triggered the development of that multivibrator pulse. Coincidence in timing between an output pulse of the zero crossing detector and any segment of the delayed multivibrator pulse is detected as a white defect indication by appropriate logic circuitry. The multivibrator output pulse width is selected so that the sum of such pulse width, and the amount by which the delayed multivibrator pulse lags the zero crossing pulse by which it was triggered, corresponds to a period at twice the desired upper threshold frequency.

Use of the aforesaid timing responsive apparatus enables accurate white defect detection without the need for response to a DC component of a filtered signal (present in use of the previously mentioned voltage level comparison technique), whereby DC stability requirements are eased for the defect detection apparatus.

A further advantage of the described timing responsive apparatus resides in the fact that its ability to discriminate between white defects and desired white signal components is essentially independent of the defect duration. In contrast, the need for an integrating filter in the voltage level comparison apparatus renders its ability to distinguish between defects and desired signal components proportional to defect duration. A practical setting for the high level comparator threshold voltage (allowing for time base errors and harmonic distortions of desired signal components and circuit instabilities, so as to avoid unnecessary triggering into the defect compensation mode) may fall at a level not reached by the output of the defect detector filter in response to short white defect conditions. This can be troublesome, since it is observed that, in the described video disc player environment, a relatively large percentage of white defect occurrences are of quite short duration, with many corresponding to a single "extra" zero crossing, or to a single "misplaced" zero crossing.

A white defect detector of the herein described timing responsive type may be satisfactorily associated with a black defect detector of the voltage level comparator type in a defect compensation system which sums the outputs of the respective defect detectors, suitably "stretches" the output of the summing device, and controls player switching between normal and substitution modes in accordance with the stretched output. However, in accordance with preferred forms of the present invention, the associated black defect detector is desirably also of a timing responsive type.

In accordance with an illustrated embodiment of such preferred forms of the invention, the associated black defect detector incorporates an RC capacitor charging circuit which is reset by each output pulse of the FM detector's monostable multivibrator. The RC time constant of the charging potential reaches the threshold potential of a black defect indicating device if the time between successive zero crossing of the FM detector input signal exceeds a period at twice the desired lower threshold frequency.

Use of black defect detection apparatus of the above-described timing responsive form permits early recognition of the onset of a black defect, without conflict with the setting of a threshold precluding false triggering of defect compensation during desired black signal component appearances. In contrast, in use of voltage level comparison approach for black defect detection, such a conflict arises in the selection of a cutoff frequency for the defect detector input filter. Setting of a high cutoff frequency, to facilitate rapid recognition of the onset of a black defect, enhances the possibility of false triggering because of insufficient attenuation of the double carrier frequency component of the zero crossing detector output. Reduction of the cutoff frequency to alleviate the false triggering problem compromises the speed and surety of recognition of black defects.

In embodiments of the present invention using the timing responsive approach for both black and white defect detection, a simplification of the filter circuitry for the associated FM demodulator may be realized relative to that required for the aforementioned voltage comparison approach.

Figure 1:
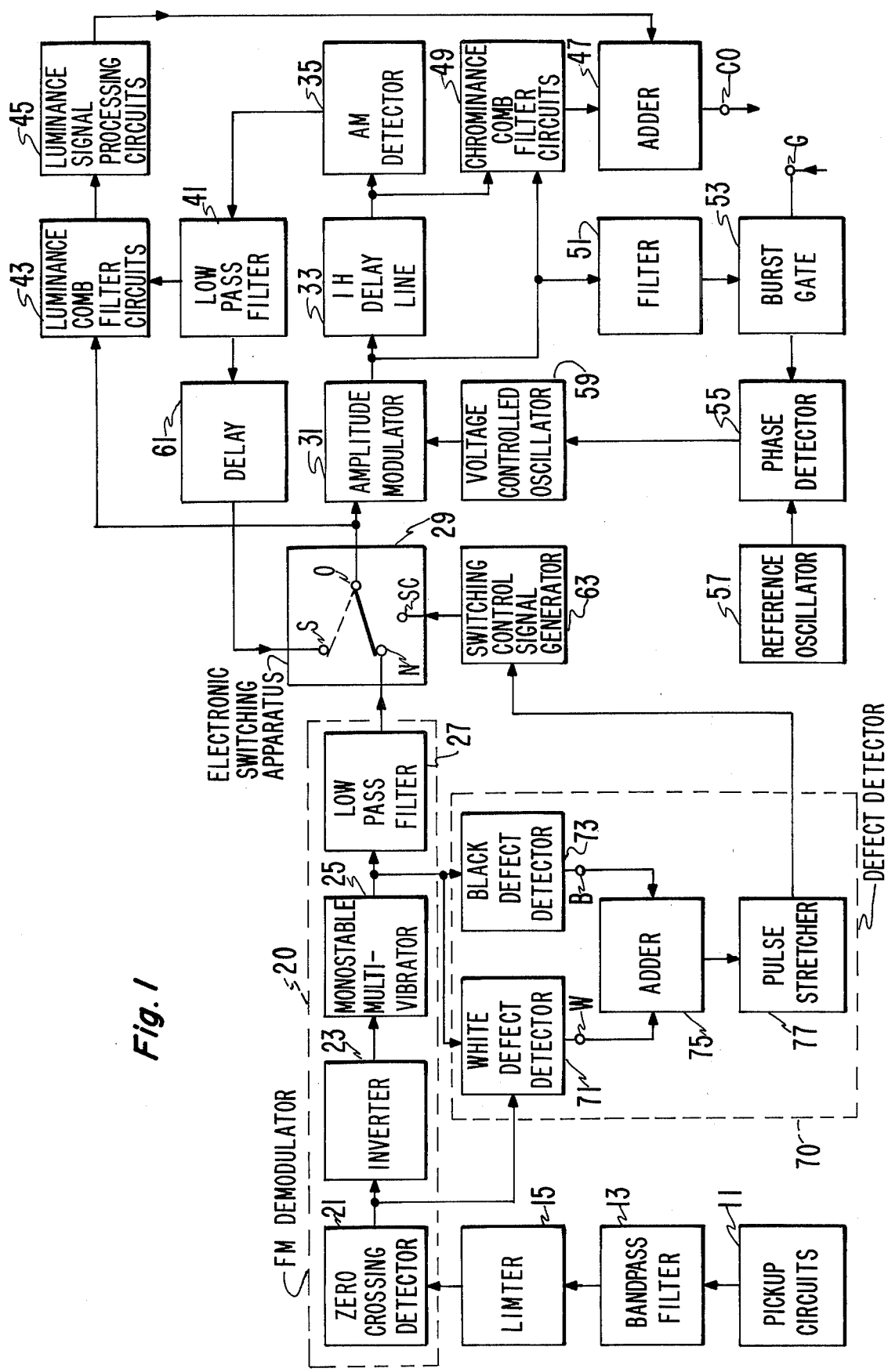
FIG. 1 illustrates, by block diagram representation, a portion of the circuitry of a video disc player incorporating a defect compensation system embodying principles of the present invention.

In the video disc player apparatus of FIG. 1, a recorded signal is recovered during playback of a video disc by a video disc pickup circuit 11. Illustratively, the video disc pickup system is of the capacitive type previously described, and the structure and circuit arrangement of the video disc pickup circuitry may be, for example, as described in U.S. Pat. No. 3,872,240, issued to D. J. Carlson, et al. on Mar. 18, 1975. The recording format of the disc subject to playback is such that the recovered signal information includes a frequency modulated picture carrier, the instantaneous carrier frequency deviating within fixed deviation range limits (e.g., 3.9–6.9 MHz) in accordance with the amplitude of a composite video signal occupying a band of frequencies (e.g., 0–3 MHz) below the deviation range, and representative of a succession of color images to be displayed.

A bandpass filter 13, having a pass band encompassing the picture carrier deviation range and appropriate sidebands thereof, selectively passes the frequency modulated picture carrier signal to a limiter 15 (serving the conventional purpose of removing or reducing spurious amplitude modulation of the input FM signal). The limiter output is applied to a zero-crossing detector 21, developing an output pulse of a given polarity in response to each zero-crossing of the limited input FM signal. The pulse output of the zero-crossing detector 21 is applied, via an inverter 23, to trigger a monostable multivibrator 25 into development of an output pulse of substantially fixed amplitude, width and polarity. The multivibrator output is supplied to a low pass filter 27, having a pass band substantially matching the pass band (e.g., 0–3 MHz) occupied by the recorded video signal information.

The circuits 21, 23, 25 and 27 form an FM demodulator 20 of a so-called pulse counter type, providing an output in the form of a composite video signal corresponding to the modulation of the input FM signal. Illustratively, the video signal information recovered from the disc comprises a composite color video signal encoded in a "buried subcarrier" format, as disclosed in U.S. Pat. No. 3,872,498, issued on Mar. 18, 1975 to Dalton H. Pritchard.

For purposes of illustration, the following parameters may be assumed to be descriptive of the buried subcarrier form of the recorded composite color video signal; (1) Color subcarrier frequency ($f_b$) = (195/2) $f_H$, or approximately 1.53 MHz, when the line frequency ($f_H$) corresponds to the U.S. standard for color television broadcasting; (2) Chrominance signal: sum of respective quadrature related subcarrier phases respectively amplitude modulated with red and blue color difference signal (R-Y, B-Y) of 0–500 KHz bandwidth, with equal bandwidth (500 KHz) upper and lower sidebands preserved (and carrier suppressed); (3) Luminance signal (Y) bandwidth; 0–3 MHz; (4) Color synchronizing component: burst of oscillations at buried subcarrier frequency ($f_b$) of reference phase and amplitude, during horizontal blanking "backporch" (corresponding to standard NTSC color synchronizing component in all but frequency and number of cycles).

Electronic switching apparatus 29 serves the purpose of alternatively: (1) completing a signal path between a "normal" signal input terminal N and the switching apparatus output terminal 0, or (2) completing a signal path between a "substitution" signal input terminal S and the output terminal 0. Switching between the respective "normal" and "substitution" states is controlled by the output of a switching control signal generator 63, which is applied to the control signal input terminal SC of the switching apparatus 29. The switching control signal generator is responsive to the output of a defect detector 70 to be subsequently explained.

The output terminal 0 of the switching apparatus 29 is coupled to the modulating signal input terminal of an amplitude modulator 31. The "normal" input signal to the switching apparatus 29 (i.e., the signal applied to terminal N, and conveyed therefrom to the modulating signal input terminal of modulator 31 during the normal mode of operation of the video disc player) is the composite video signal output of low pass filter 27. The "substitution" input signal (i.e., the signal applied to terminal S, and conveyed therefrom to the modulating signal input terminal of modulator 31 during a defect masking, or "substitution", mode of operation of the player) is a delayed composite video signal derived in a manner to be subsequently described.

Amplitude modulator 31 serves to modulate the amplitude of carrier waves, supplied by a voltage controlled oscillator 59, in accordance with the signals delivered from the switching apparatus output terminal 0. Amplitude modulator 31 is desirably of the singly balanced type (balanced against the modulating signal). The normal frequency ($f_c$) of the carrier waves supplied by oscillator 59 corresponds to the sum of the buried subcarrier frequency ($f_b$) and the desired output subcarrier frequency ($f_o$), and illustratively corresponds to 325 $f_H$, or approximately 5.11 MHz (for the instance where the desired output subcarrier frequency corresponds to the NTSC subcarrier frequency of 455/2 $f_H$, or approximately 3.58 MHz). Illustratively, oscillator 59 is a voltage controlled crystal oscillator such as is shown in the copending U.S. patent application of T. Burrus, Ser. No. 522,816, filed on Nov. 12, 1974, now U.S. Pat. No. 3,965,482.

Desirably, the frequency of the carrier waves developed by oscillator 59 varies about the aforesaid nominal frequency in consonance with any "jitter" of the frequencies of the composite video signal recovered during record playback. For this purpose, the voltage controlled oscillator 59 is associated with control circuitry in an arrangement forming a phase locked loop system, such as disclosed in U.S. Pat. No. 3,872,497, issued on Mar. 18, 1975 to J. G. Amery, et al.

In the control arrangement of the herein illustrated video disc player apparatus, the output frequency of oscillator 59 is controlled by the output of a phase detector 55, which compares in phase the color synchronizing component recovered from the record, and the output of a reference oscillator 57. Reference oscillator 57 operates at the desired output subcarrier frequency ($f_o$), and is desirably crystal controlled. The color synchronizing component is supplied by a burst gate 53, which responds to an output of amplitude modulator 31 supplied via a filter 51. Filter 51 bars passage of the relatively large amplitude carrier component in the modulator output.

Burst gate 53 desirably incorporates bandpass filter circuitry confining its response to frequencies in the output chrominance band about the output subcarrier frequency ($f_o$). Controlled by suitably timed, line frequency, gating pulses applied at gating terminal G, the burst gate 53 selectively passes the filtered output of modulator 31 appearing during the "backporch" interval occupied by the color synchronizing component. The output of burst gate 53 comprises periodic bursts of oscillations which will nominally be at the output subcarrier frequency, the synchronizing bursts falling at that frequency in the lower sideband of the output of modulator 31.

The closed loop system formed in the manner described immediately above functions to hold the synchronizing burst component in the lower sideband of the output of modulator 31 in frequency (and phase) synchronism with the highly stable output of reference oscillator 57. As jitter of the recovered composite video signal occurs, tending to cause a departure from such synchronism, the control voltage output of phase detector 55 produces a compensating adjustment of the output frequency of oscillator 59 to oppose such departure.

The amplitude modulated carrier wave output of modulator 31 is applied to the input of a 1H delay line 33. The delay line 33, providing a delay substantially corresponding to a period at the nominal line frequency ($f_H$), may illustratively comprise a glass delay line of the Amerex DL56 type. By suitable selection of the parameters of the delay line input and output terminations, the pass band of such delay line may be readily adjusted to accommodate a band of frequencies extending from slightly above $f_c$ (e.g., 5.11 MHz) to slightly below the lowest color sideband frequency (e.g., $f_o$ − 500 KHz, or 3.08 MHZ) for the output color subcarrier.

Signals from both the input and the output of delay line 33 are applied to chrominance comb filter circuits 49. The chrominance comb filter circuits 49, which illustratively comprise a subtractive combiner of the respective inputs and a bandpass filter confining the combiner output to the desired output chrominance component band (e.g., 3.08–4.08 MHz.), provide a frequency response characteristic which has a succession of rejection notches at even multiples of half the line frequency ($f_H$) and an interleaved succession of response peaks at odd multiples of half the line frequency. The output of comb filter 49 is thus a separated chrominance component in the highband location desired for output use, suitable for application to an output composite signal forming circuit, constituted by an adder 47.

For an explanation of the derivation of the luminance component input to adder 47, it is necessary to consider the operation of further circuitry responsive to the output of delay line 33. The output of delay line 33 is supplied to an amplitude modulation detector 35, which recovers a composite video signal from the amplitude modulated carrier waves passed by delay line 33. A low pass filter 41 is coupled to the output of detector 35, and has a cutoff frequency chosen to clock passage of carrier and sideband components from the output of detector 35.

An output of low pass filter 41, comprising a delayed composite video signal, is supplied, along with a relatively undelayed composite video signal derived from output terminal 0 of switching apparatus 29, to luminance comb filter circuits 43. The luminance comb filter circuits 43 serve to develop a luminance signal output substantially free of chrominance signal components. Illustratively, the luminance comb filter circuits 43 are of the form described in the copending U.S. patent application of John G. Amery, Ser. No. 570,325, filed on Apr. 21, 1975, now U.S. Pat. No. 3,969,757, and provide a comb filter having a succession of rejection notches at odd multiples of half the line frequency, and an interleaved succession of response peaks at even multiples of half the line frequency. A "filling in" of the combing action is, however, effected over a portion (e.g., 0–500 KHz.) of the unshared low band (in the general manner discussed, for example, in U.S. Pat. No. 2,729,698, issued to G. Fredendall) to avoid loss of luminance signal components representative of vertical detail.

The output of luminance comb filter circuits 43 is applied to luminance signal processing circuits 45, which may illustratively comprise a de-emphasis circuit (providing a de-emphasis of luminance component high frequencies in a manner suitably complementary to the pre-emphasis thereof employed in the disc recording operation) and a clamp circuit serving to restore the DC component of the luminance signal). The output of processing circuits 45 forms the luminance component input to adder 47, which serves to add such input to the highband chrominance component output of circuits 49 to develop at adder output terminal CO an output composite color video signal of a form suitable for application to a color television receiver. Where such application is to be to the receiver's antenna terminals, the signal at terminal CO may serve as the composite video signal input to transmitter apparatus of such a form, for example, as is shown in U.S. Pat. No. 3,775,555, issued to D. J. Carlson on Nov. 27, 1973.

The filtered output of amplitude modulation detector 35 serves an additional purpose beyond use for combing purposes. The detector output is coupled to the "substitution" signal input terminal S of switching apparatus 29, via a signal path including a low pass filter 41 and a delay device 61. The AM detector output thus provides a delayed composite video signal for use as the input to amplitude modulator 31, when defect detection by detector 70 switches the video disc player into a defect masking mode of operation. Delay device 61 provides sufficient signal delay, in addition to the delay introduced by low pass filter 41, so that the sum of these delays substantially corresponds to a half-period at the buried subcarrier frequency. This assures that, in the defect masking mode of operation, rejection at the output subcarrier frequency ($f_o$) does not occur in the chrominance comb filter circuits 49, while rejection at the buried subcarrier frequency ($f_b$) does occur in the luminance comb filter circuits 45 (as more fully explained in the copending U.S. patent application, Ser. No. 568,313, of John G. Amery, now U.S. Pat No. 3,969,759.

As additionally shown in FIG. 1, the defect detector 70, to which the switching control signal generator 63 is responsive, includes: (a) a white defect detector 71 for developing at its output terminal W an indication of the occurrence of a (white defect producing) spurious increase in the instantaneous input signal frequency above the expected carrier deviation range; (b) a black defect detector 73 for developing at its output terminal B an indication of the occurrence of a (black defect producing) spurious decrease in the instantaneous input signal frequency below the expected carrier deviation range; (c) adder 75 for combining defect indication pulses appearing at the respective output terminals W and B; and (d) a pulse stretcher 77, responsive to the output of adder 75, for developing a defect indication output signal in which each defect indicating impulse is effectively stretched, so that upon a switching of the player to the "substitution" mode, the return to a "normal" mode is postponed until normal input signal frequencies have been present for a suitable length of time.

Pursuant to the principles of the present invention, the white defect detector 71 utilizes a timing comparison approach to effect the detection of white defect occurrences. For this purpose, detector 71 is illustratively responsive to a pair of inputs derived from the circuits of FM demodulator 20: (1) an output of monostable multivibrator 25; and (2) an output of zero crossing detector 21. For a first illustration of a circuit arrangement suitable for the abovementioned white defect detector 71, reference may be made to FIG. 2 of the drawings.

Figure 2:
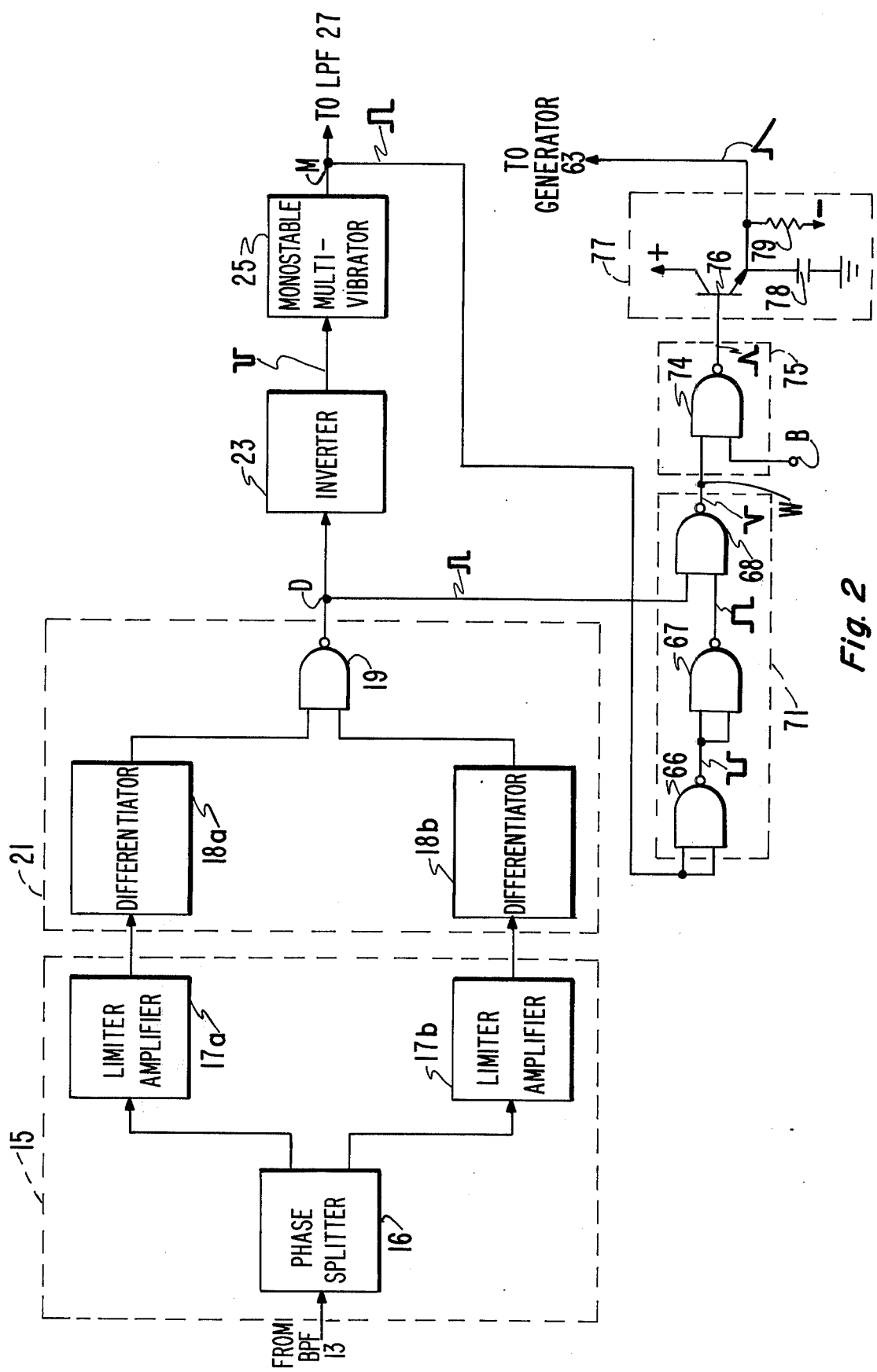
FIG. 2 illustrates, partially schematically and partially by block diagram representation, "white" defect detection circuitry for use in the defect compensation system of FIG. 1 in accordance with an embodiment of the present invention.

In FIG. 2, the limiter 15 of the FIG. 1 arrangement is shown as illustratively comprising a phase splitter 16, responding to the output of bandpass filter 13, and a pair of limiter amplifiers 17a, 17b, each responding to a respectively, different one of the oppositely phased outputs of phase splitter 16. The zero crossing detector 21 is shown as illustratively comprising a differentiator 18a responding to the output of limiter amplifier 17a, a differentiator 18b responding to the output of limiter amplifier 17b, and a nand gate 19 responding to the outputs of differentiators 18a to 18b to develop a zero crossing detector output signal at output terminal D.

The nand gate 19 is biased at its input terminals so that the output is normally low; the appearance of a negative pulse at either of the input terminals results in the development of a positive pulse at terminal D. Since one of the differentiators 18a, 18b develops a negative pulse in response to each negative-going zero crossing of the input signal to phase splitter 16, while the other of the differentiators develops a negative pulse in response to each positive-going zero crossing of said input signal, a positive pulse is developed at terminal D for each zero crossing of the input signal. Thus, for input signals varying over a desired carrier frequency deviation range of 3.9 MHz. to 6.9 MHz., for example, the pulse repetition frequency of the output at terminal D varies over a doubled frequency range extending between 7.8 MHz and 13.8 MHz.

The pulse output at terminal D is inverted in polarity by inverter 23 to develop a train of negative pulses for application to a trigger input terminal of monostable multivibrator 25, which has an output terminal M coupled to low pass filter 27. In its stable state, the output of multivibrator 25 is low; appearance of a negative pulse at the trigger input terminal when multivibrator 25 is in its stable state triggers a switching of the multivibrator state to develop a positive pulse at terminal M of a chosen width determined by time constant circuitry (not shown) of multivibrator 25. For proper recovery of the signal represented by the desired modulation of the input carrier frequency, the chosen width should not exceed a period at twice the high frequency boundary of the input carrier deviation range. For the defect detection purposes of the present invention, a choice of the pulse width is made that is appreciably smaller than a period at twice said boundary frequency, for reasons that will be explained subsequently.

The signals appearing at the respective output terminals M and D serve as the inputs to white defect detector 71. As shown in FIG. 2, the white defect detector 71 illustratively includes: (1) a nand gate 66 having both inputs conjointly receptive to the output of multivibrator 25, and thus serving as an inverter for the positive output pulses of multivibrator 25; (2) a nand gate 67 having both inputs conjointly receptive to the output of gate 66, and thus serving as a subsequent inverter for the inverted multivibrator output pulses; and (3) a nand gate 68 having one input responsive to the positive pulses appearing at terminal D, a second input responsive to the positive pulse output of gate 67, and an output coupled to the white defect detector output terminal W. When either or both inputs to gate 68 are low, the output at terminal W remains high. However, in the instance of overlap of positive pulse appearances at the respective inputs whereby both inputs are simultaneously high, a negative pulse indicative of a white defect occurrence is developed at the detector output terminal W.

The cascaded inverter stages provided by gates 66 and 67 serve to develop a delayed version of the multivibrator output pulses, which is sufficiently delayed relative to the output at terminal M as to ensure that a given output pulse of gate 19 cannot overlap with the delayed version of the multivibrator output pulse triggered thereby. With this result ensured, the only instance that will engender development of a negative pulse at terminal W is the development of two successive zero crossing pulses at terminal D sufficiently close in time that the second of the successive pulses is initiated before the termination of the delayed version of the multivibrator output pulse triggered by the preceding one of the successive pulses. The width of the multivibrator output pulse is selected so that the termination of said delayed version of a multivibrator output pulse lags the initiation of the terminal D pulse (by which it was triggered) by a time interval corresponding to a period at twice an appropriate defect threshold frequency. The defect threshold frequency may correspond to the high frequency boundary of the intended carrier deviation range, but preferably is set somewhat higher to allow for circuit tolerances, and to allow for signal conditions, such as time base errors and harmonic distortions, which may result in representation of desired white signals by apparent carrier frequencies somewhat higher than the nominal high frequency boundary. An illustrative threshold frequency setting, for the previously mentioned deviation range example of 3.9 - 6.9 MHz., is approximately 8.3 MHz.

Because of the delay imparted to the monostable pulse input to nand gate 68, there will be a maximum input frequency beyond which the described system will not provide a defect indication. However, with appropriate delay selection, this maximum frequency will be sufficiently high (e.g., approximately 28 MHz.) relative to the effective passband of the input circuits as to pose no practical problem.

The white defect indication pulses appearing at terminal W are supplied, along with black defect indication pulses from terminal B (of black defect detector 73, FIG. 1), to an adder 75. As shown in FIG. 2, the defect pulse combining function of adder 75 is illustratively performed by a nand gate 74. In the absence of defect pulse appearances, the output of nand gate 74 is low, but upon appearance of a negative defect indication pulse at either input to gate 74, a positive output pulse is developed. The output pulses of gate 74 are supplied to pulse stretcher 77, illustratively comprising a transistor 76 disposed in an emitter follower configuration with its collector connected to a positive potential supply terminal its base coupled to the output of gate 74, and its emitter connected via a resistor 79 to a negative potential supply terminal. A capacitor 78 is coupled between the emitter of transistor 76 and a point of reference potential (e.g., ground potential); and an output lead links the emitter of transistor 76 to the input of the switching control signal generator 63 (FIG. 1). When the initiation of a defect indication pulse at the base turns transistor 76 on, the potential at the emitter of transistor 76 rises rapidly above an input threshold potential of the generator 63 to initiate switching action. When the termination of a defect indication pulse at the base turns transistor 76 off, however, the potential at the emitter of transistor 76 does not drop rapidly below the input threshold potential of generator 63, but rather drops slowly at a rate determined by a charging time constant influenced primarily by the values of capacitor 78 and resistor 79. Illustratively, the time constant is selected so that a period of 2.5 microseconds must ensue (without a subsequent defect pulse appearance) following the termination of a defect pulse at the base of transistor 76 before the potential at the emitter of transistor 76 drops below the input threshold of generator 63 and switching action is terminated.

Figure 3:
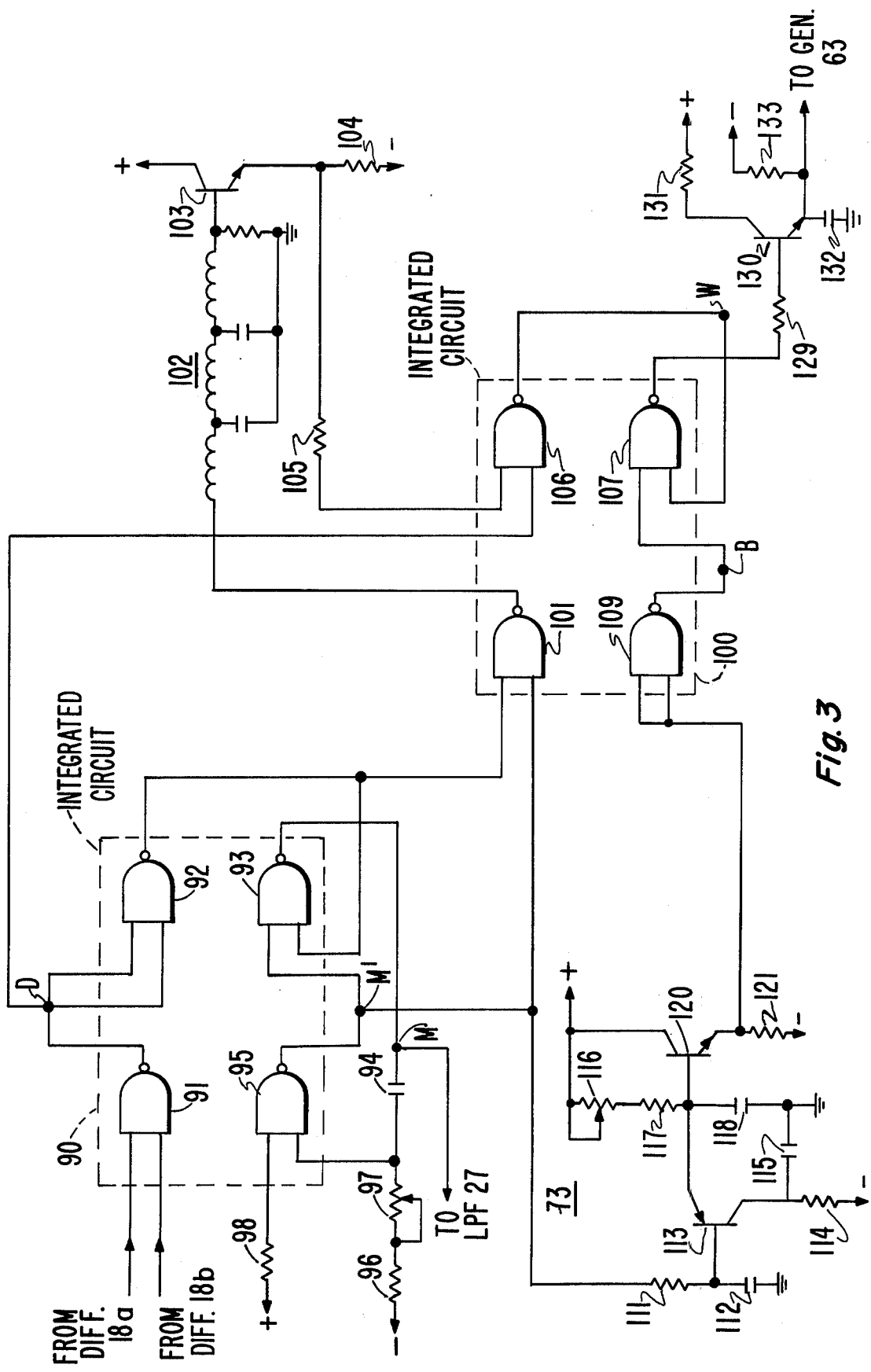
FIG. 3 illustrates schematically apparatus comprising combined "white" and "black" defect detection circuitry for use in the defect compensation system of FIG. 1 in accordance with a further embodiment of the present invention.

While the black defect detector 73, with which the white defect detecting system of FIG. 2 is associated, may be of the previously mentioned voltage level comparison type, advantages may be realized by utilizing a timing response approach therefor. FIG. 3 illustrates a modification of the arrangement of FIG. 2 in accordance with a further embodiment of the present invention, wherein a timing responsive approach is used in both black defect detection and white defect detection.

In the circuit arrangement of FIG. 3, an integrated circuit 90 (illustratively of the SN74HOO type) provides four nand gates (91, 92, 93, 95) for use in performance of FM demodulator circuit functions. Nand gate 91 receives complementary zero crossing pulse input (such as are supplied by the differentiators 18a, 18b of the FIG. 2 arrangement) and develops a positive output pulse at output terminal D for each zero crossing of the input to phase splitter 16 (FIG. 2). Nand gate 91 thus cooperates with the differentiators in performing the function of zero crossing detector 21 of FIG. 1. The pulse output of nand gate 91 is inverted by nand gate 92, having both inputs tied to terminal D (nand gate 92 thus serving the function of inverter 23 of FIG. 1). The inverted pulse output of nand gate 92 is applied to one of the inputs of nand gate 93.

Nand gate 93 is interconnected with nand gate 95 in a manner forming a monostable multivibrator (serving the function of monostable multivibrator 25 of FIG. 1). The interconnections include a connection between the output of nand gate 95 and the remaining input of nand gate 93, and a coupling, via a capacitor 94, between the output of nand gate 93 and one of the inputs of nand gate 95 (said input being also connected, via the series combination of resistor 96 and variable resistor 97, to a negative potential supply terminal). The remaining input of gate 95 is connected by a resistor 98 to a positive potential supply terminal. The monostable multivibrator output appearing at terminal M (connected to the output of nand gate 93) is supplied to low pass filter 27 (FIG. 1) for video signal recovery.

In the stable state of the monostable multivibrator, the output of nand gate 93 is low because inputs thereto are coincidentally high; i.e., the output of gate 92 is high in the absence of zero crossing pulse appearance, and the output of gate 95 is high because only one of its inputs (connected to resistor 98) is high, the other being low due to the negative bias charge on capacitor 94.

The monostable multivibrator is triggered to its other state by the delivery of a negative zero crossing pulse from gate 92 to the input of gate 93, whereby the output of gate 93 swings high. This upward transition is coupled by capacitor 94 to the input of gate 95, whereby both inputs to gate 95 are coincidentally high, causing the output of gate 95 to swing low.

The monostable multivibrator does not revert to its stable state immediately upon the termination of pulse from gate 92. Rather, such reversion must await sufficient recharging of capacitor 94 (via resistors 96, 97) to swing an input to gate 95 sufficiently low to return the output of gate 95 to a high level. Thus, the width of the positive pulse at the monostable output terminal is dependent upon the capacitor charging time constant. An illustrative setting of the pulse width (by suitable adjustment of variable resistor 97) appropriate for the defect detection purposes of the present invention, is 42 nanoseconds.

The circuit arrangement of FIG. 3 includes a second integrated circuit (illustratively of the SN74HOO type, also) providing four nand gates (101, 106, 107, and 109) for performing circuit functions in the development of a defect indication signal.

Nand gate 106 performs a similar function to that performed by nand gate 68 in the previously described FIG. 2 arrangement. That is, it receives as inputs: (a) the zero crossing pulses appearing at terminal D; and (b) a delayed version of the monostable multivibrator output pulses. However, the FIG. 3 circuit employs a different manner of developing the delayed version than was employed in the FIG. 2 circuit. A major portion of the desired delay is obtained through use of a low pass filter 102, formed by discrete inductors and capacitors in a five element, Butterworth configuration. The input to low pass filter 102 is derived from the output of nand gate 101, which has one input connected to the output of the inverting gate 92, and its other input connected to the output (terminal M') of gate 95 of the monostable multivibrator. The output of low pass filter 102 is applied to the base of an NPN transistor 103 disposed in an emitter follower configuration, with its collector directly connected to a positive potential supply terminal, and its emitter connected to a negative potential supply terminal via a resistor 104. The emitter of transistor 103 is linked to an input of gate 106 by an additional resistor 105.

It will be observed that the inputs to gate 101 are identical with the inputs to gate 93 of the monostable multivibrator, wherefore the output pulses developed at the output of gate 101 are substantially identical in timing with the monostable multivibrator output pulses developed at the output of gate 93. Coupling of the low pass filter input to the output of gate 101 (rather than the output of gate 93) permits use of filter 102 to obtain a delayed version of the monostable pulse without introduction of loading by the filter input at terminal M (thus avoiding possible adverse effects on signal delivery to low pass filter 27). Emitter follower 103 (and series resistor 105) serve as buffering elements between the low pass filter 102 and the input to gate 106. Illustratively, the element values for filter 102 are chosen to introduce an 18 nanosecond delay, so as to provide an effective total delay (inclusive of delays introduced by gate 92 and 101) of approximately 28 nanoseconds. Such a delay value is suitable, where the zero crossing pulse width at terminal D is, for example, 20 nanoseconds, to ensure that a given zero crossing pulse at terminal D cannot coincide in timing with any portion of the delayed version of the monostable pulse.

If a zero crossing pulse appearance at the terminal D input to gate 106 coincides with appearance of a portion of the delayed monostable pulse at the other input to gate 106, and the overlap endures for a sufficient period (illustratively, approximately 10 nanoseconds), a white defect indicating negative pulse is developed at the white defect detector output terminal W (connected to the output of gate 106). Such an overlap is indicative that the instantaneous input frequency has exceeded a threshold frequency ($f_t$), which may be determined in accordance with the following formula:

$$f_t = 1/[2(T_D + T_W) - T_M]$$

where $T_D$ equals the effective total delay of the monostable pulse input to gate 106, $T_W$ equals the monostable multivibrator output pulse width, and $T_M$ equals the minimum period of coincidence of high inputs to gate 106 required to initiate a negative output pulse development. For the illustrative values ($T_D$ = 28 nanoseconds, $T_W$ = 42 nanoseconds; and $T_M$ = 10 nanoseconds) given above, the threshold frequency realized is approximately 8.4 MHz., which as proved to be a satisfactory setting for discriminating between white defects and desired white signal components, where the intended carrier deviation range corresponds to the aforementioned 3.9 MHz to 6.9 MHz example.

The black defect detector 73 of the FIG. 3 circuit arrangement is responsive to the output of gate 95 of the monostable multivibrator, which appears at terminal M'. The output pulses at terminal M' substantially correspond to an inverted version of the positive pulses developed at the monostable multivibrator output terminal M, but are somewhat narrower (having a slightly delayed initiation, and a slightly earlier termination).

The negative pulses at terminal M' are applied via a resistor 111 to the base of a PNP transistor 113. A capacitor 112 is coupled between the transistor base and a point of reference potential (e.g., ground potential), and cooperates with resistor 111 to damp ringing on pulse edge transitions. The collector of transistor 113 is connected by a resistor 114 to a negative potential supply terminal, while the emitter of transistor 113 is connected by the series combination of resistor 117 and variable resistor 116 to a positive potential supply terminal. Capacitors 115 and 118 are coupled between the aforesaid reference potential point and the transistor's collector and emitter, respectively. In the absence of conduction by transistor 113, capacitor 115 is subject to charging (via resistor 114) toward the negative supply potential, while capacitor 118 is subject to charging (via resistors 116, 117) toward the positive supply potential. When the monostable multivibrator is triggered out of its stable state and the output of gate 95 swings low, transistor 113 is rendered conducting and capacitor 118 is rapidly discharged, with the emitter-connected plate of capacitor 118 dropping to a potential which is approximately one base-emitter voltage drop (i.e., one $V_{be}$) above the low state output voltage of gate 95. Upon termination of the negative pulse at terminal M', transistor 113 turns off and recharging of capacitor 118 commences.

An NPN transistor 120, disposed in an emitter follower configuration, with its collector directly connected to the positive potential supply terminal and its emitter connected via a resistor 121 to the negative potential supply terminal, has its base directly connected to the emitter of transistor 113. Both inputs of nand gate 109 are directly connected to the emitter of transistor 120. If the recurrence rate of the negative pulses at terminal M' (as determined by the frequency of zero crossing pulse appearances at terminal D) is sufficiently high, the charging of capacitor 118 during each period of cut-off for transistor 113 will be insufficient to raise the potential at the base of transistor 120 to a level one $V_{be}$ above the input threshold potential of gate 109. Under these circumstances, the output of gate 109 (appearing at terminal B) will remain high. By suitable adjustment of the capacitor charging time constant (via control of variable resistor 116), one may set a low end threshold frequency for the input to the FM demodulator, which, if not exceeded, will result in an off time for transistor 113 which is sufficiently long to allow the potential at the base of transistor 120 to rise one $V_{be}$ above the input threshold potential of gate 109, thereby causing the gate output to swing low. The resultant negative pulse at terminal B serves as an indication of the occurence of a black defect.

The low end threshold frequency ($f_{TL}$) is subject to determination in accordance with the formula:

$$f_{TL} = 1/[2(T_{W'} + T_C)]$$

where $T_{W'}$ is the pulse width of the negative pulse output of gate 95, and $T_C$ is the time required for the charging circuit for capacitor 118 to raise the potential at the base of transistor 120 from one $V_{be}$ above the low state output potential of gate 95 to one $V_{be}$ above the input threshold potential of gate 109. An illustrative setting of 3.3 MHz for $f_{TL}$ has proved satisfactory for discriminating between black defects and desired black signal components, where the intended carrier deviation range corresponds to the aforementioned 3.9 MHz to 6.9 MHz. example.

The emitter follower transistor 120 serves as a buffer between the charging circuit 116, 117, 118 and the inputs to gate 109. Additionally, the presence of the base-emitter path of transistor 120 effectively balances the voltage drop of the base-emitter path of transistor 113 (1) to restore lost voltage range for the charging requirement in defect indication, and (2) to introduce compensation for temperature effects on the $V_{be}$ of transistor 113.

The black defect detector output terminal B is directly connected to one of the inputs of nand gate 107, while the white defect detector output terminal W is directly connected to the remaining input of nand gate 107. In the absence of defect indication pulses, both inputs to gate 107 are high, with the consequence that the gate output is normally low. Upon the appearance of a defect indication pulse at either of the terminals B, W, the output of gate 107 swings high. Gate 107 thus serves the function of adder 75 of FIG. 1, combining (and inverting) the respective black defect indicating pulses and white defect indicating pulses to form a combined signal in which a positive pulse appears upon each detection of a defect, whether black or white.

The output of nand gate 107 is connected via a resistor 129 to the base of an NPN transistor 130. The collector of transistor 130 is connected by means of a resistor 131 to the positive potential supply terminal, while the emitter of transistor 130 is connected to the negative potential supply terminal via resistor 133. A capacitor 132 is coupled between the emitter of transistor 130 and the aforementioned reference potential point. An output lead links the emitter of transistor 130 to the input of the switching control signal generator 63 (FIG. 1).

When a positive pulse, indicative of a defect occurrence, appears at the output of gate 107, transistor 130 is rendered conducting and its emitter potential rapidly rises above the input threshold potential of generator 63 to initiate switching action. When the output of gate 107 drops at the termination of the defect indication pulse, transistor 130 cuts off. The subsequent decline of its emitter potential occurs at a rate determined by a charging time constant for capacitor 132, which is set to produce an appropriately stretched "substitution" period (as previously described for the pulse stretcher 77 of FIG. 2).

Figure 4:
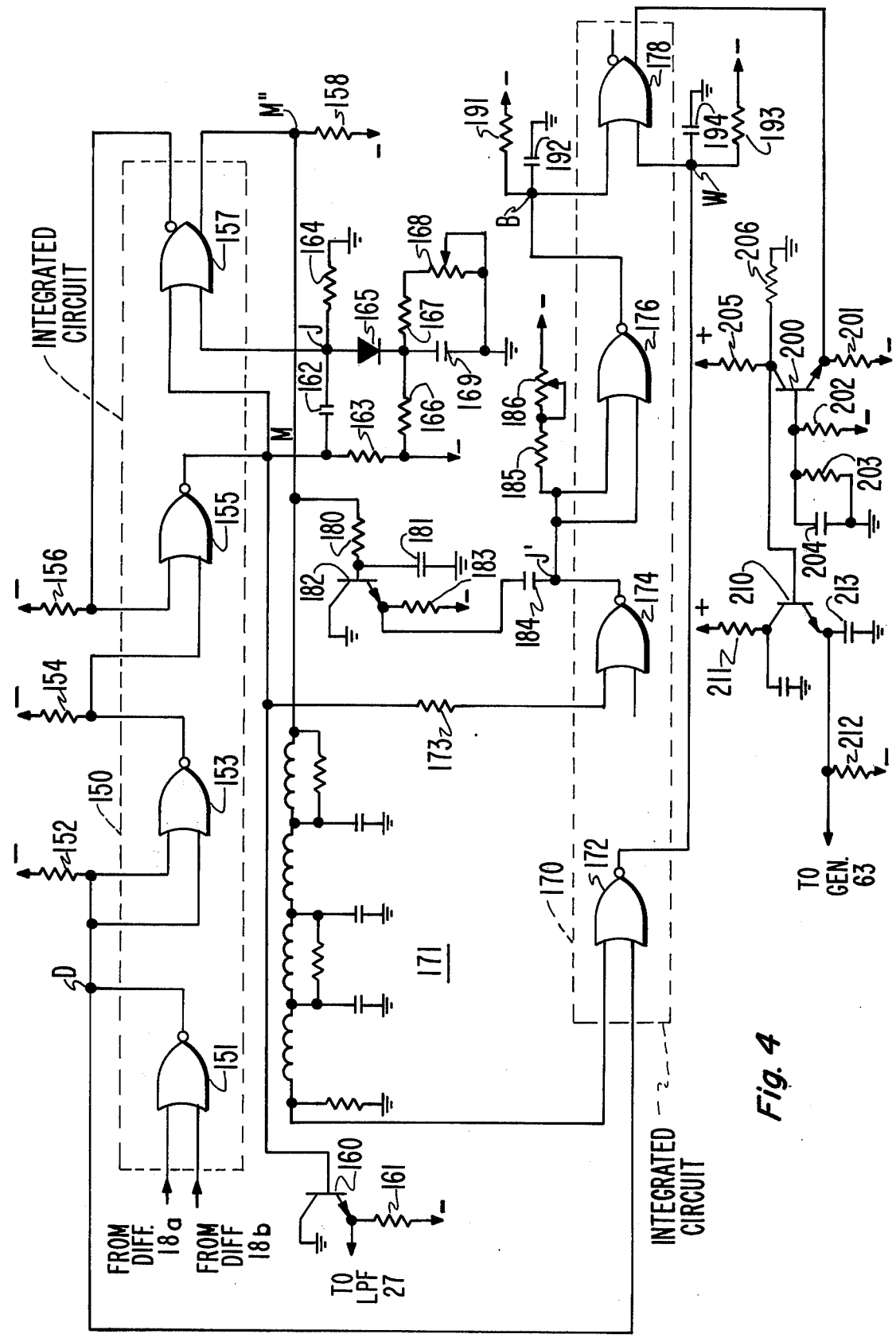
FIG. 4 illustrates schematically a modification of the combined detection circuitry of FIG. 3 in accordance with another embodiment of the present invention.

FIG. 4 illustrates a modification of the circuit arrangement of FIG. 3 in accordance with a further embodiment of the present invention. In the FIG. 4 circuit, use is made of a pair of integrated circuits 150 and 170, each employing logic circuits of ECL form and providing a quartet of nor gates (with one of the gates having an additional "or" output); illustratively, the integrated circuits are Type MC10102, with the gates (151, 153, 155, 157) of integrated circuit 150 performing functions of the FM demodulator 20 of FIG. 1, and the gates (172, 174, 176, 178) of integrated circuit 170 performing functions of the defect detector 70 of FIG. 1.

In FIG. 4, respective complementary differentiator outputs (e.g., from differentiators 18a and 18b, as shown in FIG. 2) are supplied to the respective inputs of nor gate 151. The output of nor gate 151, connected via resistor 152 to a negative potential supply terminal, is normally high, but swings low in response to a positive pulse appearance at either input. A positive pulse appears at one input to gate 151 in response to each positive-going zero crossing of the input to phase splitter 16 (FIG. 2), while a positive pulse appears at the other input to gate 151 in response to each negative-going zero crossing of the phase splitter input. The output of gate 151, appearing at terminal D, thus comprises a train of negative pulses representing each zero crossing of the phase splitter input (nor gate 151 thus cooperating with differentiators 18a, 18b to perform the function of zero crossing detector 21 of FIG. 1).

Nor gate 153, having both of its inputs directly connected to the zero crossing detector output terminal D, and its output connected via resistor 154 to the negative potential supply terminal, serves the function of inverter 23 of FIG. 1, developing an output comprising a train of positive pulses representative of the input signal zero crossings.

Nor gates 155 and 157 are intercoupled with each other and off-chip components in a manner to form a monostable multivibrator (to serve the function of monostable multivibrator 25 of FIG. 1). A first input of gate 155 is directly connected to the output of the inverter gate 153, while the second input of gate 155 is connected via resistor 156 to the negative potential supply terminal. The output of gate 155, which is returned to the negative potential supply terminal by means of resistor 163, is directly connected to one of the inputs of gate 157. The remaining input of gate 157, which is returned to a point of reference potential (e.g., ground potential) by resistor 164, is capacitively coupled (by capacitor 162) to the output of gate 155. The "nor" output of gate 157 (additionally having an "or" output, to be subsequently considered) is directly connected to the above-mentioned second input of gate 155.

In the stable state of the monostable multivibrator, both inputs to gate 155 are low and its output is high, while both inputs to gate 157 are high and its "nor" output is low. Appearance of an inverted zero crossing pulse at the first input of nor gate 155 causes the output of gate 155 to swing low, driving both inputs of gate 157 low and switching the "nor" output of gate 157 to a high state (wherefore the second input of gate 155 is high).

The monostable multivibrator output terminal M (directly connected to the output of gate 155) thus swings low in response to the zero crossing pulse appearance. The low state at terminal M is maintained, however, after the zero crossing pulse terminates (and the first input to gate 155 swings low again) because the second input to gate 155 remains high due to the high state of the output of gate 157. The high state of the output of gate 157 persists until its input (connected to the junction of capacitor 164) rises above a gate threshold potential in response to the charging of capacitor 162 via resistor 164. When the threshold is reached, the output of gate 157 switches to a low state; with both inputs to gate 155 now low, its output returns to the high state, and the multivibrator resumes its stable state, terminating the negative output pulse development at terminal M.

The junction (terminal J) of capacitor 162 and resistor 164 is connected to the anode of a diode 165. The cathode of diode 165 is connected to the output terminal of a variable voltage divider formed by the series combination of resistors 166 and 167 and variable resistor 168. The series combination is connected between the negative potential supply terminal and the aforementioned reference potential point. The divider output terminal is provided at the junction of resistors 166 and 167; a capacitor 169 is coupled between this junction and the reference potential point. The divider sets the high state potential reached by the gate 157 input (connected to terminal J) in the multivibrator's stable state, and thereby determines how far below the gate input threshold potential the terminal J is swung during multivibrator triggering. The charging time for return to the threshold potential (and, accordingly, the width of the output pulse at terminal M) is thus responsive to the voltage division level as set by adjustment of variable resistor 168. An illustrative pulse width setting in use of the FIG. 4 arrangement is approximately 50 nanoseconds.

The monostable multivibrator output pulses at terminal M are applied to the base of an NPN transistor 160 disposed in an emitter-follower configuration, with its collector directly connected to the reference potential point, and its emitter connected via resistor 161 to the negative potential supply terminal. Signals appearing at the emitter of transistor 160 are applied to low pass filter 27 (FIG. 1) for video signal development.

Terminal M is also connected via a resistor 173 to one of the inputs of nor gate 174. Emitter follower 160 and series resistor 173 effectively isolate the filter and gate inputs. No external connections are made to the remaining input of gate 174 which is held in a low state by a pull-down resistor internal to integrated circuit 170. The negative output pulse of the multivibrator at terminal M causes the output of gate 174 to switch to its high state. The output of gate 174 is connected via the series combination of resistor 185 and variable resistor 186 to the negative potential supply terminal.

The "or" output of gate 157 (terminal M") is connected by resistor 158 to the negative potential supply terminal, and by resistor 180 to the base of an NPN transistor 182 disposed in an emitter-follower configuration. The collector of transistor 182 is directly connected to the reference potential point, while the base is coupled thereto via a capacitor 181. The emitter of transistor 182 is connected via a resistor 183 to the negative potential supply terminal, and via a capacitor 184 to the output of gate 174.

Negative pulses appear at terminal M", which correspond to a somewhat narrowed (initiation lagging; termination leading) version of the multivibrator output pulse developed at terminal M. These negative pulses are partially integrated at the base of transistor 182 by the cooperative effect of resistor 180 and capacitor 181.

During intervals between multivibrator output pulse appearances, the potential at the junction (J') of capacitor 184 and resistor 185 drops toward the potential of the negative potential supply terminal at a rate influenced by the values of resistors 185,186. Upon the initiation of a negative output pulse at terminal M, the switching of gate 174 effectively clamps the potential at junction J' at the high state potential of the gate 174 output. Shortly thereafter, the emitter of transistor 182 swings negative in response to the pulse initiation at terminal M". Shortly before the end of the multivibrator pulse at terminal M, the emitter of transistor 182 swings in the positive direction, causing a rise in the potential at terminal J' above the normal high state potential at the output of gate 174 and cutting off the output device of gate 174, which remains off thereafter as the input supplied via resistor 173 swings low. The decline of the potential at junction J' then recommences.

If the time between successive multivibrator output pulses is sufficiently long, the potential at junction J' drops below the input threshold potential of nor gate 176, which has both inputs directly connected to terminal J'. Such a drop causes the normally low output of gate 176 to swing high, developing a positive pulse, indicative of a black defect, at black defect detector output terminal B (directly connected to the output of gate 176).

The negative pulses at terminal M" are also applied via a low pass filter 171 (illustratively, of a seven element Butterworth configuration, providing a delay of 15 nanoseconds) to a first input of nor gate 172. The second input of gate 172 receives zero crossing pulses from terminal D. The output of gate 172, normally low, swings high if an overlap of sufficient duration occurs between the delayed multivibrator pulse and the zero crossing pulse. The resultant positive pulse appears at the white defect detector output terminal W, which is directly connected to the output of gate 172.

Terminals B and W are directly connected to the inputs of gate 178, which provides at its "or" output a positive pulse in response to a positive defect pulse appearance at either of the black or white defect detector output terminals B or W.

The "or" output of gate 178 is directly connected to the emitter of transistor 200, disposed in a common-base configuration. The emitter of transistor 200 is connected by resistor 201 to the negative potential supply terminal, while the collector of transistor 200 is connected to the junction of resistors 205, 206 serially disposed between the reference potential point and a positive potential supply terminal. The base of transistor 200 is connected via a resistor 202 to the negative potential supply, and via a resistor 203 (shunted by capacitor 204) to the reference potential point. The common-base transistor stage serves as a level translator, translating the swings between the low and high states of the gate 178 output to wider swings about an elevated potential.

The collector of level translating transistor 200 is directly connected to the base of an NPN transistor 210, having its collector connected to the positive potential supply terminal by resistor 211, its emitter connected to the negative potential supply terminal via resistor 212, and its emitter coupled to the reference potential point by means of capacitor 213. Transistor 210, and its associated circuitry, perform the function of stretching the defect pulses supplied from the emitter of transistor 210 to the input of switching control signal generator 63 (in the manner previously described for the stretcher circuitry of FIG. 3).

To assure that short defect detector output pulses endure at the emitter of transistor 200 sufficiently to provide a full level translator output swing, additional stretching action is effected at terminals B and W by the integrating actions of (a) resistor 191 connected between terminal B and the negative potential supply terminal, and capacitor 192 coupled between terminal B and the reference potential point; and (b) resistor 193 connected between terminal W and the negative potential supply terminal, and capacitor 194 coupled between terminal W and the reference potential point.

The use of logic circuits of an ECL form in the FIG. 4 circuit arrangement (in contrast with the use of circuits of a TTL form in the FIG. 3 circuit arrangement) has proven to be advantageous in meeting strict RFI limits typically imposed on apparatus intended for attachment to the antenna input terminals of a television receiver.

What is claimed is:

1. In a video disc player including pickup circuits for developing during playback of a video disc record an FM signal having an instantaneous frequency subject to variation over a given deviation range in accordance with the amplitude of recorded video signals, the combination comprising:

a zero-crossing detector for developing output pulses indicative of the zero crossings of the signal developed by said pickup circuits;

a monostable multivibrator responsive to the output pulses of said zero-crossing detector;

a low pass filter coupled to receive an output of said multivibrator;

means for utilizing the output of said low pass filter to control the display of images;

means for developing a delayed version of an output pulse of said multivibrator; and means responsive to coincidence between a portion of an output pulse of said zero-crossing detector and a portion of said delayed version of an output pulse of said multivibrator for altering the mode of operation of said output utilizing means.

2. Apparatus in accordance with claim 1 wherein said operation mode altering means is also responsive to means for indicating when the lapse of time between successive output pulses of said multivibrator exceeds a selected time duration.

3. In a signal translating system including a source of carrier waves, the instantaneous frequency of which is subject to variation over a given deviation range in accordance with the amplitude of a desired signal of a given bandwidth, said source being randomly subject to occasions of defective operation during which the apparent instantaneous frequency of said carrier waves departs from said given deviation range; frequency modulation detecting means coupled to said source, said detecting means including means responsive to said carrier waves for developing a trigger pulse of a given polarity in response to each zero crossing of said carrier waves; a monostable multivibrator having an input terminal coupled to the output of said pulse developing means, said multivibrator being subject to triggered development of an output pulse of a substantially constant width in response to an appearance of a trigger pulse of said given polarity at said input terminal when said multivibrator is in its stable state; and a low pass filter having a passband substantially limited to said given bandwidth for providing a demodulated signal having an amplitude normally corresponding to the amplitude of said desired signal but subject to spurious amplitude variations during said occasions of defective operation; signal utilization means; and means for normally supplying the demodulated signal output of said low pass filter to said signal utilization means; a defect detection and compensation system comprising, in combination:

delay means coupled to said multivibrator for developing a delayed version of a multivibrator output pulse;

means, having respective inputs coupled to said delay mens and to said pulse developing means, for indicating the occurrence of an overlap in time between said delayed version of a multivibrator output pulse and one of said trigger pulses; and means responsive to the output of said time overlap indicating means for disabling said demodulated signal supplying means.

4. Apparatus in accordance with claim 3 wherein said disabling means includes means for effectively stretching the duration of said disabling beyond the termination of an overlap indication by said indicating means.

5. Apparatus in accordance with claim 3 wherein the delay imparted by said delay means is such as to cause the leading edge of said delayed version of a multivibrator output pulse to lag the leading edge of the trigger pulse causing the triggered development of said multivibrator output pulse by a selected time interval exceeding the maximum trigger pulse width.

6. Apparatus in accordance with claim 5 wherein the sum of said selected time interval and the width of said delayed version of a multivibrator output pulse is less than a period at twice the maximum frequency of said given deviation range.

7. Apparatus in accordance with claim 3 also including a delayed signal source and normally disabled means for supplying signals from said delayed signal source to said signal utilization means, and wherein said disabling means also serves to enable said normally disabled signal supplying means.

8. Apparatus in accordance with claim 7 also including:

means coupled to said multivibrator for indicating the occurrence of a lapse of time between successive output pulses of said multivibrator which exceeds a selected time duration; and means for rendering said disabling means additionally responsive to said time lapse indicating means.

9. Apparatus in accordance with claim 8 wherein the sum of said selected width of said multivibrator output pulse and said selected time duration is greater than a period at twice the minimum frequency of said given deviation range.

10. Apparatus in accordance with claim 9 wherein said time lapse indicating means includes a capacitor charging circuit subject to resetting by each output pulse of said multivibrator.

* * * * *